United States Patent [19]
Friedman et al.

[11] Patent Number: 5,883,939
[45] Date of Patent: Mar. 16, 1999

[54] DISTRIBUTED ARCHITECTURE FOR AN INTELLIGENT NETWORKING COPROCESSOR

[75] Inventors: Roy Friedman; Kenneth P. Birman, both of Ithaca, N.Y.

[73] Assignee: Cornell Research Foundation, Inc., Ithaca, N.Y.

[21] Appl. No.: 705,423

[22] Filed: Aug. 29, 1996

[51] Int. Cl.[6] .............................. H04M 1/24; H04M 3/08; H04M 3/22

[52] U.S. Cl. ..................................... 379/9; 379/1; 379/26; 379/10; 379/14; 379/15; 370/216; 370/217; 395/181; 395/182.08; 395/182.09; 395/182.02

[58] Field of Search ............................... 379/1, 9, 10, 13, 379/14, 15, 34, 221, 229, 230, 26, 181; 395/182.02, 182.08, 182.09, 182.13, 616, 618; 370/221, 229, 230, 216, 217

[56] References Cited

U.S. PATENT DOCUMENTS

| | | | |
|---|---|---|---|
| 4,455,645 | 6/1984 | Mijioka et al. | 379/2 |
| 5,060,258 | 10/1991 | Turner | 379/112 |
| 5,084,816 | 1/1992 | Boese et al. | 395/575 |
| 5,235,700 | 8/1993 | Alaiwan et al. | 395/182.11 |
| 5,386,467 | 1/1995 | Ahmad . | |
| 5,404,508 | 4/1995 | Konrad et al. | 395/600 |
| 5,452,441 | 9/1995 | Esposito et al. | 395/182.08 |
| 5,463,615 | 10/1995 | Steinhorn | 395/182.02 |
| 5,469,500 | 11/1995 | Satter et al. . | |
| 5,475,813 | 12/1995 | Cieslak et al. | 379/221 |
| 5,521,971 | 5/1996 | Key et al. | 379/220 |
| 5,526,492 | 6/1996 | Ishida | 395/180 |
| 5,544,077 | 8/1996 | Hershey | 395/182.09 |
| 5,548,710 | 8/1996 | Oono et al. | 395/181 |
| 5,592,466 | 1/1997 | Buczny et al. | 370/217 |
| 5,615,255 | 3/1997 | Lemieux | 379/230 |
| 5,621,884 | 4/1997 | Beshears et al. | 395/182.08 |
| 5,636,341 | 6/1997 | Matsushita et al. | 395/182.11 |
| 5,675,723 | 10/1997 | Ekrot et al. | 395/182.02 |

*Primary Examiner*—Curtis A Kuntz
*Assistant Examiner*—Rexford N Barnie
*Attorney, Agent, or Firm*—Jacob N. Erlich; Jerry Cohen

[57] ABSTRACT

Group communication technology, such as the Horus process, is used to implement a fault-tolerant high performance, reactive, real-time distributed IN coprocessor. The architecture of the distributed IN coprocessor comprises workstation clusters, external adaptors and an update interface interconnected by high speed communication links. Each workstation of the IN architecture represents a query element, so all the databases used by the IN coprocessor in the course of servicing incoming requests are split between query elements, provided that each of the workstations has access to the information stored in a certain database or databases. Group communication systems provide necessary features for managing and obtaining high reliability and operability of the IN coprocessor including failure detection, notification of other members of the system about the failures, reconfiguration of the system to exclude failed members, bringing back into the system the members that have been recovered, and updating the recovered or new members according to the new state of the system.

18 Claims, 5 Drawing Sheets

DISTRIBUTED ARCHITECTURE FOR AN INTELLIGENT NETWORKING COPROCESSOR

STATEMENT OF GOVERNMENT INTEREST

This invention was partially funded by the Government under a grant from ARPA/ONR, grant N0014-92-J-1866. The Government has certain rights in portions of the invention.

BACKGROUND OF THE INVENTION

The present invention relates generally to the art of hierarchical structures for telecommunication switching nodes where each switching node comprises a switch and Intelligent Networking (IN) coprocessor. More particularly, the present invention relates to the use of group communication technology to implement a distributed IN coprocessor.

The distributed IN coprocessor of the present invention comprises at least one external adaptor (EA), multiple query elements (QE), and an update interface (UI), all of which are the members of the same Horus group. In such a distributed architecture the data bases used by the IN coprocessor are split among the structural elements of the coprocessor to provide for increased information storage capacity and for the possibility of periodical "on the fly" software upgrades without halting the IN coprocessor.

The concept of the intelligent network (IN) came to existence as a result of a merger of advanced telecommunication and computer technologies to become a key feature under a broad range of new functions and services that modern telecommunication service providers offer businesses and individual customers. The term "intelligent network" has come to identify an interconnected system of functional elements that can implement changes and modifications of itself or its behavior through software means as opposed to hardware.

Before the intelligent network era, the intelligent part of servicing an incoming call in a telecommunication system was performed either by human operators or by fixed logic relay switches. This simple mode of a telecommunication system provided the customers with such a simple phone service as call routing, for example, but that system was incapable of providing advanced services like 1-800 or 1-900 calls, conference calls, caller ID, call forwarding and the like. In other words, the functions of call processing and actual delivery of the calling service were performed by the same switching node with only very limited call processing capability.

With the development of the foregoing computer technology, fixed relay logic devices gradually became obsolete and were replaced by programmable switching devices which were flexible and easily adaptable to changes. Such computer programmable switches were suitable for handling much higher volumes of phone calls at a much higher speed while offering the subscribers a range of more sophisticated available telecommunication services. Another change in the functionality of the switching devices was brought about by the advent of the "out-of-band" signalling, meaning that the voice channels of a telecommunication system were separated from the channels that processed the information necessary to handle the calls, like routing or billing. Thus, there arose a possibility of expanding the range of available features and services in a telecommunication system by combining the benefits of a flexible programmable switching device with a separate data signaling infrastructure. Such a possibility was realized in the electronic switching system. The current, seventh version of the electronic switching system, signaling system 7 (SS7), has become the standard for all communication link exchanges in the U.S. and many other countries.

The SS7 system switch itself is capable of performing a well known set of simple tasks, such as call routing for regular calls, hang-up processing and other simple functions. But when the SS7 system switch receives a more complex request that it is not programmed to service, it has to place a query to another network element to handle the request. The part of the SS7 telecommunication network that services the complex requests and relays back to the switch the instructions as to how to further handle such requests is the intelligent network (IN) coprocessor.

An example of a complex request that requires more intelligent handling than a switch can provide and, therefore, requires the participation of the IN coprocessor, is a 1-800 number call. In this case the SS7 switch does not immediately route the call, but connects to the signaling network and communicates the query to the IN coprocessor.

The IN coprocessor responds to the query by providing the switch with two sets of instructions necessary to service the 1-800 call. First, it converts the toll-free number into the real standard-format number using a database that contains the pertinent information and instructs the switch to direct the call to the real number. Second, the IN coprocessor relays back to the switch the billing instructions that reverse the charge for the call to the receiving party. Other similar typical functions performed by the IN coprocessor include caller ID, automatic transferring of a call according to the caller's phone number, conference calling, and voice menus.

Since the address-translation functions together with handling call routing and billing instructions in the IN coprocessor are managed by programmable computers, it becomes relatively easy and inexpensive to develop software and reprogram the computers in a way that allows implementing various combinations of old and new telecommunication services for different categories of calls and groups of customers without having to re-implement the switches themselves. The ability to provide customized responses to the incoming requests by programming or reprogramming the query-handling computers within the network and, in particular, within the IN coprocessor, is the underlying concept of the intelligent networking technology.

Typically the intelligent network comprises the following functional elements: service switching points, service control points, service transfer points, service management system, service creation environment, service nodes, adjuncts, and intelligent peripherals. The elements of the IN network that are of importance in describing novelty and advantages of the present invention are the following:

service switching points (SSP), serving as an interface between customers placing calls and the rest of the intelligent network. These are programmable electronic switching systems that are programmed to determine whether an incoming call requires special handling and to relay the appropriate request to the IN coprocessor for call routing and billing instructions.

service control points (SCP) that are "the brain" of the intelligent network. A SCP is an on-line database that contains all kinds of customized information about subscribers, service delivery instructions and other pertinent call processing data. Service control points function as call and service control elements of the IN network by relaying call processing information to the service switching points via multiple communication links, like SS7 communication links.

signal transfer points (STP) that are packet switches (often referred to in the Internet context as "routers") of high capacity and reliability. Their main function is to route signals between switches and between SSPs and SCPs.

Until recently, IN coprocessors have most often been implemented by fault tolerant computers, such as the ones manufactured by Tandem(TM), or Stratus(TM), usually connected by dual channels to a switch. The dual channel connection between different elements of the IN network ensures that there will be no single point of failure. Although this implementation meets the fault-tolerance requirements of the SS7 specification, it also has two limitations. First, a single machine has a limited memory capacity or disk space, limiting the size of the databases it can store and handle. Second, when a single machine is used, it is either very difficult or completely impossible to perform "on the fly" software upgrades without halting the entire IN coprocessor.

In the prior art the above limitations were typically overcome by using a clustered style of distributed architecture to implement the IN coprocessor. In such a distributed architecture the databases used by the IN coprocessor are split among the elements of the coprocessor. These elements of the coprocessor are computers that are interconnected and can communicate with each other. The split database concept allows the IN coprocessor to store and process much more information than a single computer IN coprocessor would be capable of storing and processing, as well as allowing it to bring down a single computer, load the new version or upgrade the software in that computer, bring the computer up, and then repeat this procedure with other computers, one at a time, until all the computers of the coprocessor have been updated.

For example, in U.S. Pat. No. 5,386,467 to Ahmad a distributed intelligent network communication system comprising the network of interconnected multiple databases (SCPs) and switches (SSPs) is disclosed. The problem addressed by that Patent was handling complex telecommunication services that require more exchanges of data between SSPs and SCPs without delays in obtaining the call processing information. The solution disclosed by Ahmad was to preprogram the SCPs of the network to recognize the situations where handling the call required additional information from another SCP. After such a recognition has taken place, the Ahmad IN network is adapted to relay a query between a switch and a database or between different databases. The elements of that IN system include, in particular, a signaling network that interconnects switches and multiple data bases. The signaling network transmits messages between SSPs and SCPs in SS7 protocol. In that network the communication occurs not only between a switch and a data base, but also between different data bases. In a situation when a data base cannot answer a request, it forwards the request to another database instead of sending the request back to the switch that originally issued the request. When another data base generates the reply, it communicates the reply to the switch. According to a different mode of processing queries disclosed in the Ahmad Patent, a database that cannot handle the request forwards it to another switching system for further processing.

U.S. Pat. No. 5,469,500 to Satter et al. discloses a call processing architecture that includes external information sources coupled with a plurality of distinct and modular servers for connecting the call processor to the external information sources. The servers operate independently from the call processor and are reconfigurable without affecting the functionality of the call processor. The disclosed architecture is characterized by the ability to use both a dedicated service node for autonomously delivering a particular calling service and a SCP with access to the resources of an intelligent periphery (IP).

But in order to provide a reliable IN coprocessor in good operable condition there still exist several problems that the prior art Patents failed to address. These problems include the implementation of the IN coprocessor capable of sustaining a large number of requests (calls) per second (in other words, high throughput), the implementation of an architecture that uses a cluster of computers as a coprocessor for a single switch, and creating a distributed IN coprocessor that meets the fault tolerance requirements of the SS7 specification.

The advantages of the present invention over the prior art references reside in the fact that for the first time the operability requirements expected from an IN coprocessor are met by using group communication technology to implement a distributed IN coprocessor while successfully solving the problems of achieving high throughput and low latency communication, and maintaining the necessary fault tolerance requirements. In other words, the present invention uses group communication technology for building fault tolerant high performance reactive real-time applications, such as distributed IN coprocessors. Taking into account the fact that IN coprocessors represent a multi-billion dollar hardware market, it is highly desirable to implement a distributed IN coprocessor architecture that is free of performance problems of the distributed IN systems disclosed in the prior art Patents that do not use the group communication approach.

Group communication systems use the abstraction of process groups to simplify the design and implementation of fault-tolerant distributed applications. Process groups are an addressing domain, allowing messages to be sent either to the entire group, or to a subset of the members of the group by invoking a single downcall. A group communication system guarantees that such a message is delivered reliably to all of its recipients. Another useful feature of group communication technology is that group communication systems provide failure detection, which notifies members of the group about failures of other members, and automatically reconfigures the group to exclude a failed member whenever a failure occurs, or to bring back into the group recovered members once they have recovered. In the latter case, group communication systems also provide tools for updating recovered members regarding the new state of the system. For a more detailed description of group communication technology and systems, reference may be made to United States provisional patent application entitled "Horus: A Flexible Group Communication System" filed Aug. 28, 1996 under Express Mail Certificate of Mailing No. EH762631712US and to United States provisional patent application entitled "A Framework For Protocol Composition In Horus" filed Aug. 28, 1996 under Express Mail Certificate of Mailing No. EH762631638US, the disclosures of which are hereby incorporated by reference.

None of the prior art Patents implements group communication technology in a telecommunication system for achieving a high throughput by buffering requests that correspond to several calls for a short while and then sending them together, using circular queues of requests to limit the number of timer expiration events on the implementation of the external adaptors, and using the water marks approach to overcome overloads in the system. Moreover, the Ahmad system does not provide for the devices similar to the external adaptors in the present invention that handle queries according to the queries' parity and serve either as a primary or a backup external adaptor in servicing a query. Similarly, the method described in the Satter patent does not describe the method of handling a query by external adaptors and multiple query elements.

Another problem that has not been addressed in the prior art Patents is achieving a high throughput by using a clustered IN coprocessor for a single switch. Though it is understood that the principles of the present invention are applicable to building IN networks with the IN coprocessors communicating with many switches, the present invention specifically considers the mode of the operation of the IN coprocessor in which it communicates with only one switch. The "one switch-one IN coprocessor" embodiment of the present invention prevents sharing of one IN coprocessor between many switches, and thus provides a better utilization of the database resources, better throughput, and better guarantees that the switch sustains more calls during overloads. However, it is to be understood that the present invention also includes within its scope several switches connected to the same IN coprocessor via a single signal transfer point.

SUMMARY OF THE INVENTION

It is an object of the present invention to implement group communication technology in a telecommunication network to simplify the task of developing distributed applications, detect failures of the structural elements, and to provide for automatic network reconfiguration while maintaining the fault-tolerance requirements of the SS7 protocol specifications.

And another object of the present invention is to use clusters of computers as an IN coprocessor to communicate with a single switch in a hierarchical switching node.

It is also an object of the present invention to provide a method for implementing a hierarchical switching node that continually sustains a large number of requests per minute.

Yet another object of the present invention is to provide a high throughput hierarchical switching node by buffering incoming requests, corresponding to several calls, for a short period of time and then serving the buffered requests all together, keeping the requests in a cyclic set of queues, and using the water marks approach to overcome overloads in the network.

Briefly, these and related objects in accordance with the present invention are accomplished by using group communication technology, such as the Horus system, and implementing this technology to the task of designing and building fault-tolerant high performance reactive real-time applications, such as distributed IN coprocessor. The architecture of the distributed IN coprocessor comprises workstation clusters, external adaptors and an update interface interconnected by high speed communication links. Each workstation of the IN architecture represents a query element, so all the databases used by the IN coprocessor in the course of servicing incoming requests are split between query elements, provided that each of the workstations has access to the information stored in a certain database or databases.

Group communication systems provide such necessary features for managing and obtaining high reliability and operability of the IN coprocessor as failure detection, notification of other members of the system about the failures, reconfiguration of the system to exclude failed members, bringing back into the system the members that have been recovered, and updating the recovered or new members according to the new state of the system.

These and other aspects of the present invention will become more apparent to those skilled in the art by reference to the following description and to the appended drawings.

BRIEF DESCRIPTION OF THE DRAWING FIGURES

Figure 4A:
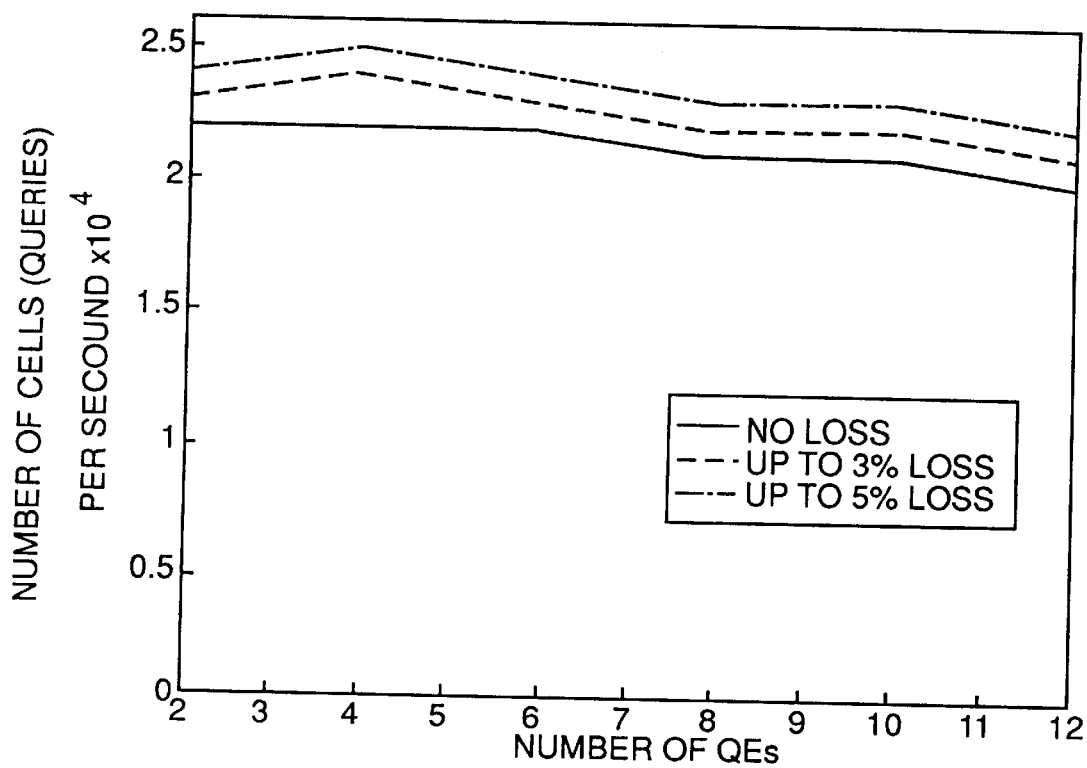
Figure 4B:
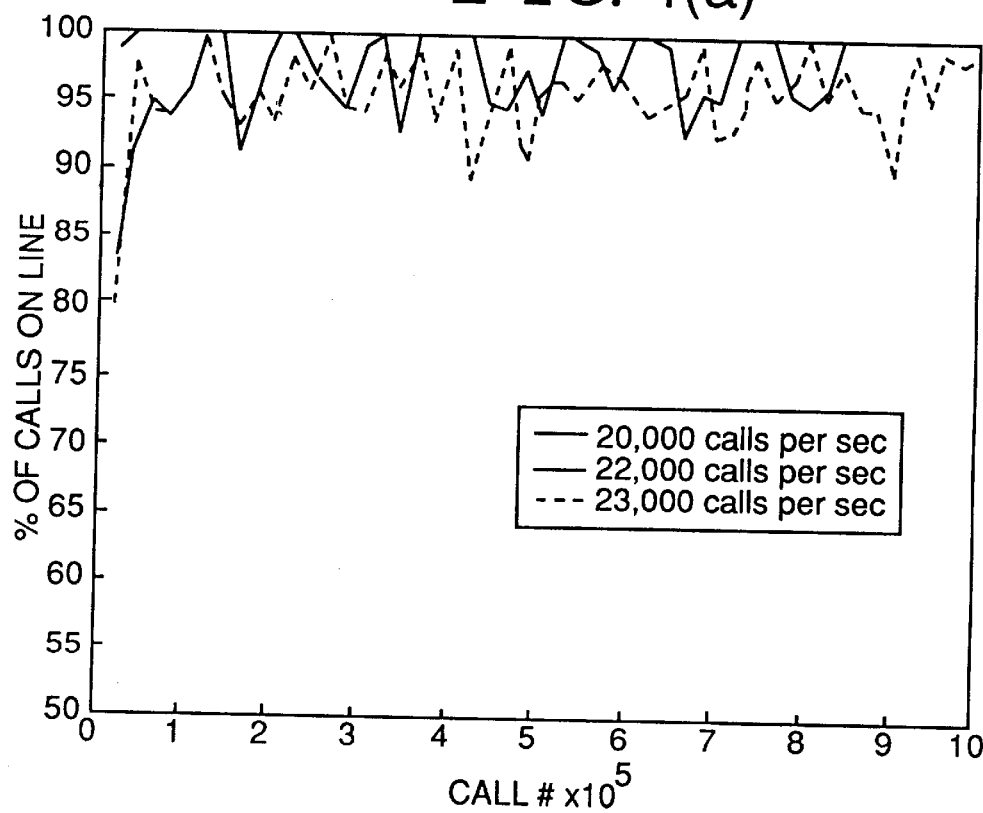
Figure 4C:
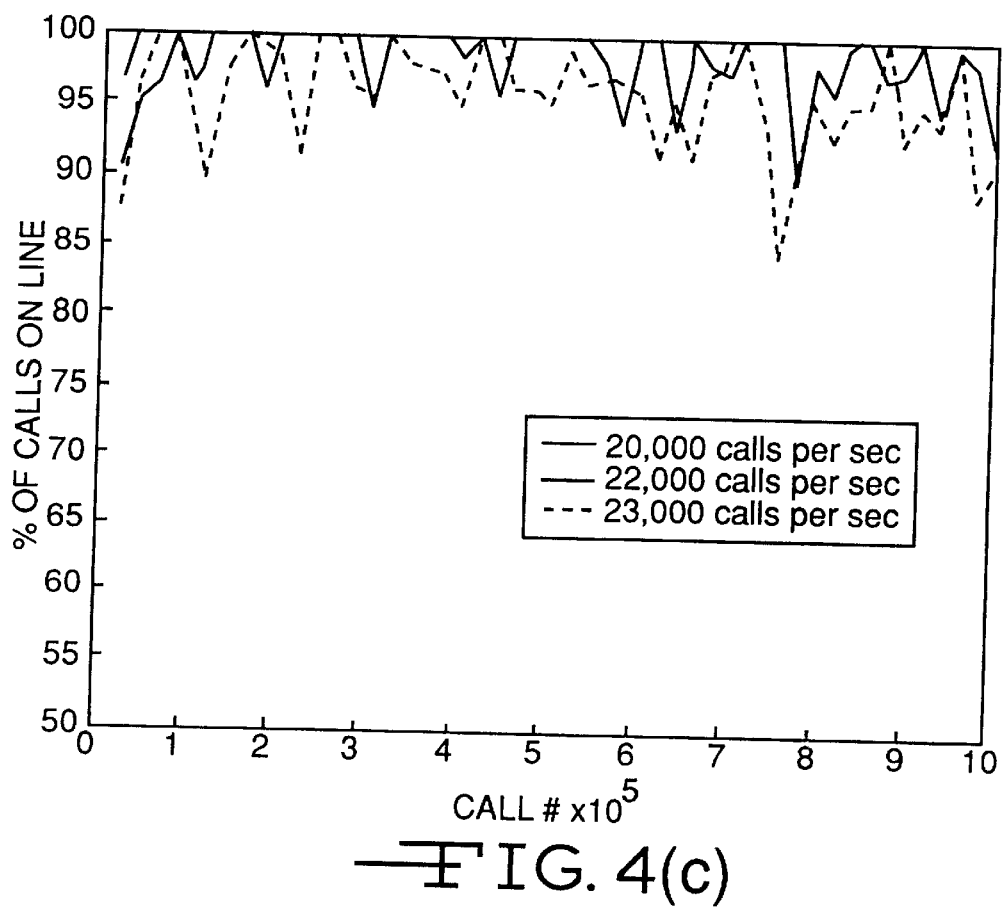

FIGS. 4(a)–4(c) present three graphs illustrating the behavior of the IN network under various modes of operation in accordance with the present invention.

DETAILED DESCRIPTION OF THE PREFERRED EMBODIMENT

Figure 1:
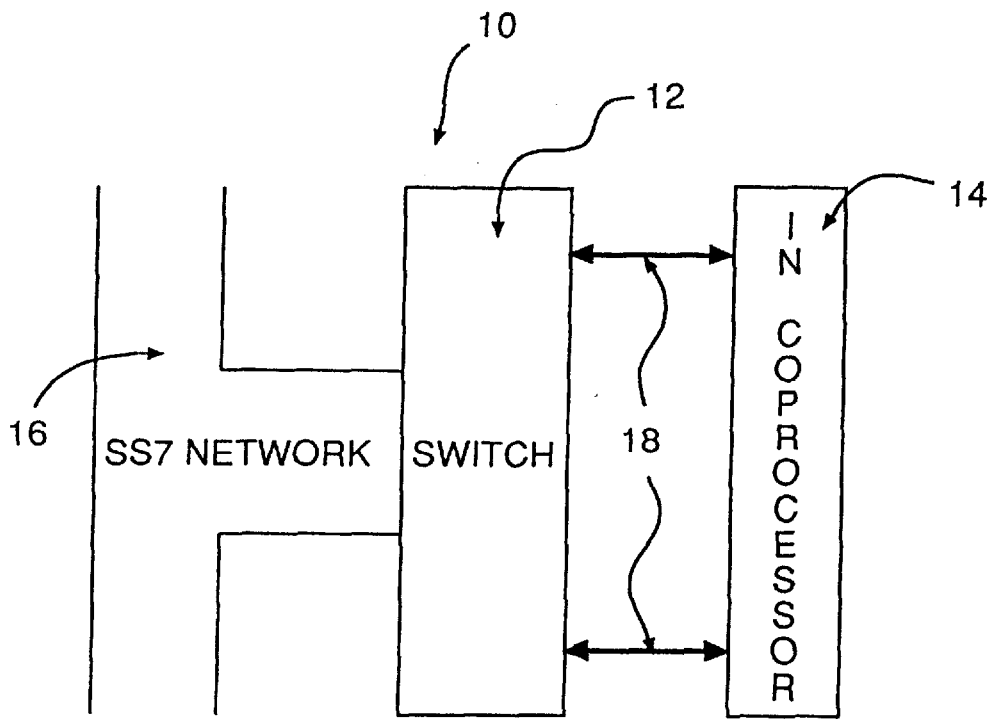
FIG. 1 is a block diagram showing a hierarchical structure for a telecommunication switching node.

Referring now to the drawings, FIG. 1 shows the hierarchical structure of a telecommunication switching node 10 in the SS7 switching network architecture. A switching node like switching node 10, is composed of a switch 12 (analogous to a SSP described earlier) and an Intelligent Networking (IN) coprocessor 14. IN coprocessor 14 communicates with switch 12 via communication links 18, receiving queries from or giving call processing instructions to the switch. After receiving the instructions from coprocessor 14, switch 12 communicates with the SS7 network 16 according to the received instructions.

Figure 2:
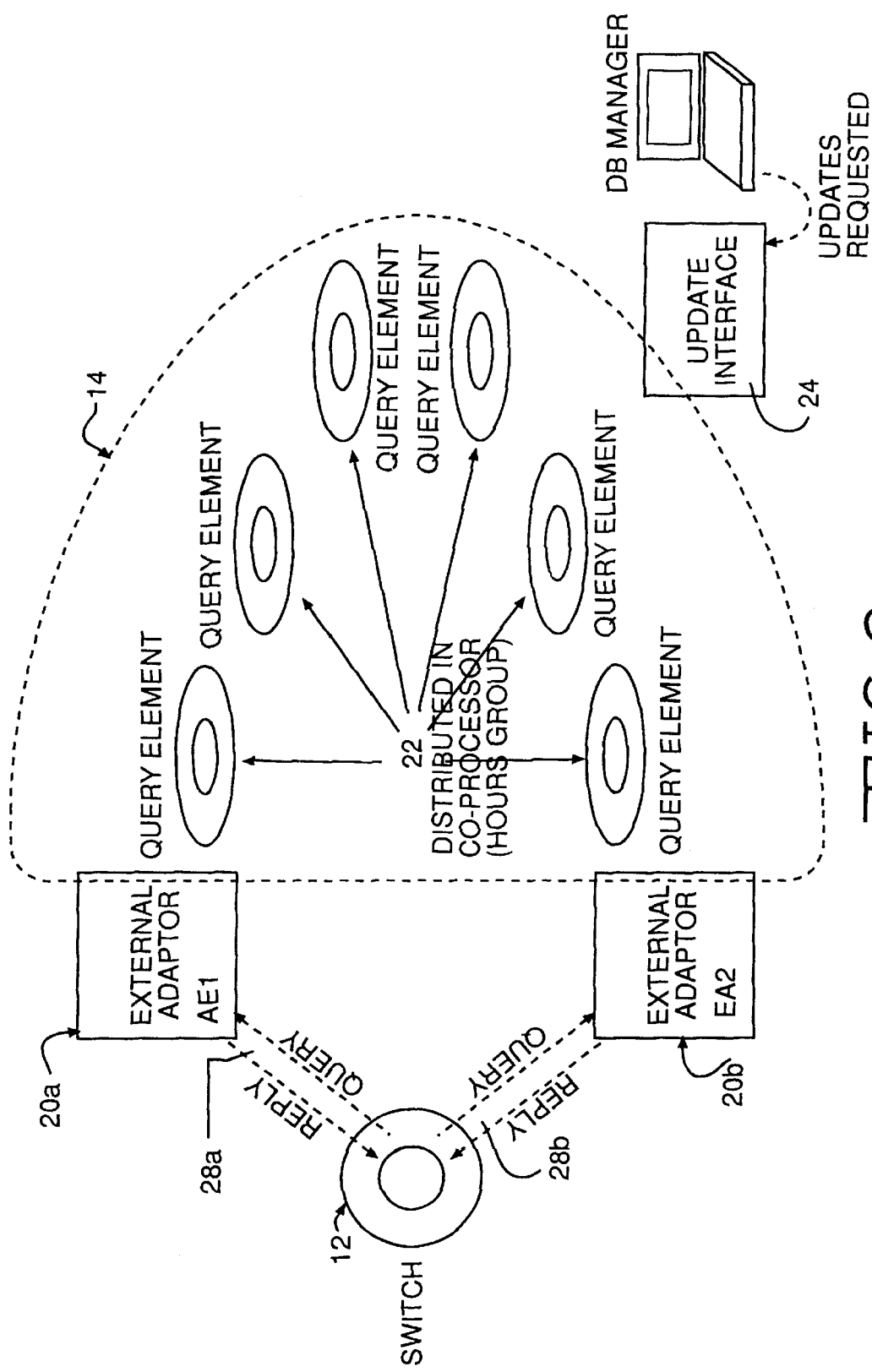
FIG. 2 is a block diagram of the distributed IN coprocessor that implements group communication technology in accordance with the present invention.

The distributed architecture of IN coprocessor 14 in accordance with the present invention is illustrated in FIG. 2 and comprises the following functional elements: external adaptors 20a and 20b, a plurality of query elements 22 (analogous to SSPs described earlier), and an update interface 24, all of which are members of the same Horus process group, i.e. of the same group communication system. For the purposes of simplicity external adaptors 20a and 20b will be referred to as EA1 and EA2 (or EAs), a query element 22 will be referred to as a QE (or QEs, if referred to several or all query elements) and update interface 24 will be referred to as the UI.

The EA1 and EA2 are designed to serve as interfaces for coprocessor 14 in order to communicate with switch 12. As illustrated in FIG. 2, switch 12 is connected by reliable point-to-point two-way channels 28a and 28b to the EA1 and EA2 respectively. In order to maintain high fault tolerance characteristics of the coprocessor, several EAs can be used to provide the necessary interface between a coprocessor and a switch. Typically, as in the preferred embodiment of the present invention, two EAs are employed. In the present invention the EAs make the distributed IN coprocessor appear to the rest of the SS7 network (and, in particular, to STPs and SSPs) as a single non-replicated component. Thus, in the present invention an EA may or may not be functionally similar to a STP described earlier.

The QEs have access to the data-base, and are responsible for executing the queries that are sent to the QEs by the switch. Each entry in the data-base is held by more than one QE, which means that the database is replicated for increased availability. The UI is an interface through which updates to the database are initiated.

It should be understood that the present invention can be built and practiced to support any degree of redundancy by changing its parameters, and the description of the mode of operation of the IN coprocessor can be generalized to higher numbers of switches, EAs, QEs, and UIs in a natural way.

Basic Mode of Operation of the Preferred Embodiment

Whenever switch 12 needs to send a query to IN coprocessor 14, it sends a query to both EA1 and EA2 via channels 28a and 28b, respectively. After receiving a query from switch 12, both EA1 and EA2 must propagate the query to the QEs that can handle this query. After the QEs that were assigned to this query determine the response, they report it to EA1 and EA2, which then relay the answer back to switch 12. In the present invention queries are identified by unique sequence numbers, and both EA1 and EA2 have a fast way of knowing which QEs can handle which queries, e.g., by looking at a hash table.

In the process of receiving a query from switch 12 and communication of the query to IN coprocessor 14, EA1 serves as a primary EA for all odd numbered queries and a backup EA for all even numbered queries, while EA2 serves as the primary EA for all even numbered queries and a backup EA for all odd numbered queries. The primary EA picks one of the QEs to handle the query, and forwards the query to this QE. In order to achieve good load balancing between the QEs, the QE for a query is picked by a deterministic uniform distribution function, among those that can service it. It is an advantage of the distributed architecture in accordance with the present invention that it has all QEs active at all times, handling different queries. When a QE receives a query, it starts servicing it, becoming the primary QE responsible for servicing that query. After computing the reply, the primary QE sends the reply to both EA1 and EA2, regardless of which EA has forwarded the query. Both EAs then relay the reply on both channels to switch 12.

In case the backup EA does not get a reply for a query after half the expected deadline for this query, it reissues this query to one of the QEs in the same way as the primary EA would. However, the deterministic uniform distribution function used in this case guarantees that the QE that is chosen by the backup EA is different from the QE chosen for the same query by the primary EA. The QE that was chosen by the backup EA services the request and sends the reply to both EA1 and EA2, which then relay it to switch 12, again, on both channels.

Of course, if the Horus group communication system detects that either EA1 or EA2 has failed, it reconfigures the membership to exclude this EA. Subsequently, the only surviving EA will handle all requests, until the failed EA recovers, or is replaced. Similarly, if Horus detects that a QE has failed, it will reconfigure the group to exclude this failed QE, so that no more queries will be forwarded to it, until it has been recovered, or replaced, and was added again to the group.

Such an approach is different from typical primary-backup protocols that are known to those skilled in the art. In the present invention both the primary EA and the backup EA relay the answer even when all other messages arrive on time. This is done in order to overcome a failure of one of the links between the EAs and switch 12. Unlike usual primary-backup schemes, also well-known in the art, in the implementation of the present invention the backup EA reissues the request without waiting for the failure detector to report a failure. The reason for this is that the deadline before switch 12 drops a call is on the order of a hundred milliseconds. However, unless a computing node is manually taken off-line for service, it may take the failure detector a few seconds to detect a failure. Waiting for the failure detector would therefore increase the probability of dropping the same call repeatedly, a type of failure that is considered extremely serious in the SS7 architecture. The alternative of reducing the detection time of the failure detector would result in an excessive rate of false failure detections, which would make the system too unstable for practical use.

The approach implemented in the present invention avoids this problem by reissuing a request if a reply was not received after half the deadline, even if the failure detector has not yet detected any failure. It permits the system to ride out the period between when a failure occurs and when it is detected.

Achieving High Throughput

Figure 3:
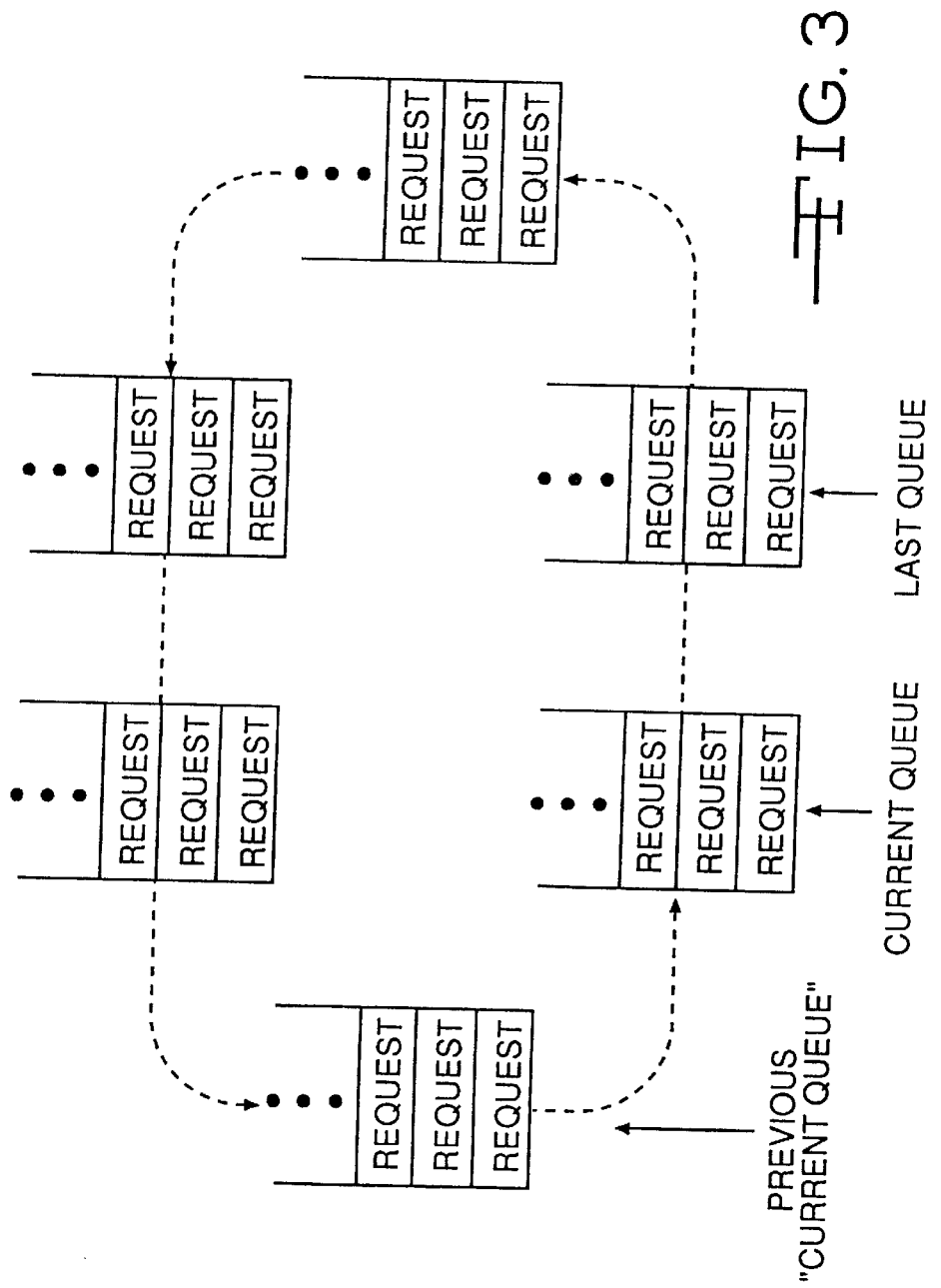
FIG. 3 is a block diagram illustrating the concept of buffering requests and holding them in cyclic queues in accordance with the present invention.

Since a backup EA must reissue a request if the backup EA has not received a reply from a QE within half the deadline for servicing the call, a method for effectively performing the reissuing function by aggregating (or buffering) requests into sets of requests, arriving at a proximity of 15 milliseconds of each other, has been implemented in the present invention. These buffered requests are kept in a cyclic set of queues, such that every request is inserted into the current queue, as illustrated in FIG. 3. The cyclic set of queues in the implementation of the present invention is similar to the cyclic set of queues described in the publication "Hashed and Hierarchical Timing Wheels: Data Structures for the Efficient Implementation of a Timer Facility." by G. Varghese and T. Lauck in Proc. of the 11th ACM Symposium on Operating Systems Principles, pages 25–38, November 1987, Austin, Tex. Then, every 15 milliseconds, a sweeper task scans the last queue, i.e., the one that follows the current queue, reissues all the requests which are held in this queue and for which a reply has not arrived yet, and then assigns the last queue to be the new current queue. The number of such queues is half the deadline time multiplied by the frequency of the sweeper plus one. This ensures that every request will be reissued, if necessary, after roughly half its deadline.

The present invention implements a similar protocol for sending messages from the EAs to the QEs and back. According to that protocol, the queries at the EAs and the replies at the QEs are buffered into packets, and every 15 milliseconds a sweeper thread sends all buffered queries or replies in one Horus message. The important feature of that protocol is that the requests and replies are buffered at the application level, and a Horus message is allocated only when the buffered data needs to be sent, for example, once every 15 milliseconds. Moving the buffering to the application level instead of buffering messages using a layer of Horus improved the throughput by a factor of up to 5.

Handling Overloads

One of the main goals of the present invention, aside from being able to overcome failures, is to make sure that as many requests as possible will be answered within the assigned deadline. Similar to other (hard and soft) real-time systems, the present invention uses the rule that it is better to drop several requests if it seems that there is no chance of servicing them in time, than to service every request but to miss all deadlines. The rule is described in the publication "Distributed Systems", S. Mullender, editor, Chapter 16 "Real-Time and Dependability Concepts" by H. Kopetz and P. Verissimo, Addison Wesley, 1993.

A situation where this rule must be applied happens whenever the system becomes overloaded. That is a situation when for some reason switch 12 suddenly receives more calls than it was designed to handle. In practice events like this occur if, for example, there is a natural disaster such as a major power failure or an earthquake. In such cases it is very important to service some of the requests in time, and it is even more important to be able to resume normal service in which all new calls are serviced in time, as soon as the load becomes normal again.

In order to guarantee this behavior, both the EAs and the QEs in the present invention employ a watermarks approach for receiving new queries. That is, whenever the number of pending queries exceeds some predetermined maximum known as the high watermark, a EA, or QE, starts dropping all new queries that it receives until the number of pending queries drops below some predetermined minimum, known as the low watermark. After the number of pending calls drops below the low watermark, new queries are serviced as usual. Of course, the high watermark and the low watermark can be set individually for each EA and each QE.

Updating the Data-Base

In the preferred embodiment of the present invention it is presumed that all updates of IN coprocessor 14 are initiated only at update interface 24 (UI), as depicted in FIG. 2. Whenever an update to the data-base is requested, the UI multicasts an update message to all the query elements 22 within IN coprocessor 14. This is done by invoking the Horus xxx_cast( ) downcall. If there are updates that need to be sent only to some QEs, but not to all of them, this can be implemented by one Horus XXX_send( ) downcall.

Although Horus is capable of providing ordering for multicasts (for example, by guaranteeing that all QEs see queries in the same order), the degree of ordering supported can be varied to match the needs of the application. In the preferred embodiment of the distributed IN coprocessor architecture in accordance with the present invention, "sender ordering" or "first-in-first-out" ordering is sufficient. Although this means that there can be very short periods in which queries that access the same data entry (phone number) on different QEs will return different replies, the SS7 specification suggests that this does not represent a real problem in terms of the correct behavior of the application. The real requirement turns out to be the following: Whenever a service (phone number) is canceled, it is first reported as canceled, and only then it is actually disconnected. Thus, by the time the "plug" is pulled out, all QEs are already informed about this. To respect this requirement, the present architecture is designed so that when a service (phone number) is added, it is first "plugged in", and only then reported as added. Hence, if a QE finds a service (phone number) in the data-base, it is already available. In order to modify an existing entry in the data-base, the following method is performed: (a) the new service (phone number) is "plugged in", (b) a busy signal is generated for the old service (number), (c) an update message is sent to every group member by the UI, (d) the old service (number) is disconnected.

This method guarantees servicing a customer's call promptly and properly for the following reasons: The time to update all EAs and QEs is a few milliseconds. So, even if a customer gets a busy signal only because an update is taking place, the customer cannot distinguish between this and a real busy signal, and by the next time this customer tries to make the same call, the system will have completed the update and will treat the call in the normal manner. Moreover, if the update affects data-bases held by more than one switch, then it is impractical to update all these switches at the same time, or in the same order with respect to other calls. Therefore, a method like this one should be used since it does not reduce availability more than would a method in which messages were delivered in identical ("total") order within the distributed IN coprocessor, but using total ordering within the IN coprocessor would have degraded the performance of the system and would have resulted in potentially noticeable delays during reconfiguration.

Removing a Failed Processor (Query Element)

Whenever an EA or a QE fails, it is technically possible to continue operating without reconfiguring the group membership list to report the failure, because our backup approach does not wait for the failure detector to report a failure before the backup comes into action. However, not removing failed members from the group reduces the throughput of the IN coprocessor, increases the probability of missing deadlines, and reduces the resiliency of the distributed coprocessor to future failures.

If the primary EA for a certain query, or the QE that was picked up by the primary EA for this query has failed, then half the deadline time for this query will be wasted before the backup will kick in. Thus, if something additional goes wrong, for example, a network error or congestion, which causes slight additional delays, then there is less spare time to absorb this. Also, for half the deadline times in our case, 50 milliseconds, the query is just waiting in vain, without actually having a chance to be serviced. For this duration of time, the query is counted as pending by the EAs, increasing the vulnerability of the coprocessor to overloads.

Thus, whenever the failure detector of Horus detects a QE or an EA as failed, the system reconfigures itself to exclude the failed member from the membership list. If the excluded member is an EA, then the surviving EA starts acting as a primary for all queries. If the excluded member is a QE, then no more queries will be directed to it.

Adding a Recovered Processor (Query Element)

Whenever a member, i.e. processor, recovers, it is highly desirable to add this member back to the group, so it can help to share the load with another member, and to ensure that if another member falls, there will be enough members that can continue to provide service to the switch. Similarly, being able to add new members is important to allow to scale up while the switch is running and to support software upgrades during the life-cycle of the switch.

As a group communication system, Horus has built-in tools to support the required reconfiguration. The only aspect that needs to be handled by the application concerns bringing the recovered (newly added) member up to date with the current state of the data base. The present architecture uses the following method the newly added member up to date.

The system's state is dumped to disk periodically, for example, once a day, and log files are used to maintain updates that occur between dumps. Hence, before a recovered (newly added) processor p joins the group, it first reads from disk the last saved state. If the log is large, it may also be advisable to read the log before p joins the group. After p has been added to the group, one of the other processors sends a state-log message to p which includes the logged updates, or just those that p has not already read. When p receives the state-log message, it applies all the updates contained in that message to the state that it recovered from disk. Afterwards, p broadcasts a state-ready message to all other members of the group, indicating to them that it has come up to date with the state of the system, and can now handle requests. If an update from the UI is received by p before it gets the state-log message, then p buffers the update message until it receives the state-log message and is able to apply the updates reported in that message. Following this, p replays the buffered update messages from the UI.

Also, if by the time another configuration change happens, p did not multicast the state-ready message, then one of the old members will re-send a state-log to p, to make sure that even if due to a failure p did not receive this message before, it will eventually receive it.

Characteristics of the Performance of the System

The distributed architecture of the IN coprocessor that uses Horus in accordance with the present invention was implemented for mockup testing as defined in the SS7 specification on a cluster of RS/6000 nodes of an IBM™ SP2™ parallel computer, running the AIX 3.2 operating system and the POE run-time environment. These nodes operate at 66.7 MHz, each equipped with 128 MBytes of memory. The communication was done, through Horus, over the High-Performance Switch of the SP2, using an active messages interface, as described in "Design and Performance of Active Messages on the SP-2." by C. Chang, G. Czajkowski and T. von Eicken in Technical Report TR96-1572, Department of Computer Science, Cornell University, February 1996.

During the tests it was required that the switch receive a reply to each request for service from the IN coprocessor within 100 milliseconds, otherwise the call had to be dropped. The round-trip latency of active messages on the SP2 for 4 KByte messages, which is roughly the largest message that was sent through the system, is 200 microseconds. The maximum achievable throughput using active messages is 34.5 Mbyte/sec. Horus itself adds 200–400 microseconds to the total delay of each message. However, by aggregating requests and replies and sending them only every 15 milliseconds, the system successfully reduced the effective delay per query (or reply) attributed to Horus to only 1–2 microseconds.

The system was tested by using active messages, since they provide an easy user space interface to the High-Performance Switch. The benefit of employing a user space interface is that it reduces the amount of time needed to access the network. When using IP protocols, the interaction with the kernel for each "send" or "receive" costs several hundreds of microseconds, even though messages still go through the High-Performance Switch. When operating in high load, and when the size of the group increases, these periods affect the ability of the system to meet deadlines when the application cannot do anything else. Thus, the main saving from using active messages does not come from the time a message spends on the network itself (the "wire"). Rather, the saving is by having a much shorter access time to the network. By implementing active messages instead of IP protocols the distributed IN coprocessor in accordance with the present invention has gained a factor of 2–4 in throughput, depending on the number of QEs. This improvement also indicates that the efficiency of the network interface being used is extremely important for the ability of the system to scale to large number of QEs.

Failure Free Runs

The graph in FIG. 4(a) illustrates the ability of the system to handle various loads depending on the number of QEs when there are no failures or additions of nodes. Presented in this graph are the maximum number of calls that can be imposed on the system such that all calls make their deadlines, the maximum number such that no more than 3% of the calls miss their deadline, and the maximum number such that no more than 5% of the calls miss their deadline. These numbers were achieved by examining the system's behavior during a period of 1,000,000 calls.

The graph in FIG. 4(b) illustrates the behavior of the system with 10 QEs. This graph presents the percentage of calls that made their deadline when the load was 20,000 calls per second, 22,000 calls per second, and 23,000 calls per second. The granularity at which these numbers were taken is 20,000 calls. At the beginning of the run, a few calls miss their deadline even for a load of 20,000 calls per second. This phenomena repeated itself in many runs and is attributed to the time required for Horus to initialize its data structures, and create sufficient caching for later usage.

The jitters in the graph of FIG. 4(b) in the case of overloads can be partially attributed to occasional operating systems or POE related interferences. Using the "getrusage" routine, the system demonstrated a good correlation between cases where a large number of calls were dropped and the process being involuntarily context switched, and sometimes even swapped out. The actual throughput of the system is slightly higher when implemented with a microkernel instead of a full blown operating system and running only the IN software on each node. On the other hand, since the system demonstrated a good correlation between the size and frequency of the jitters and the load, the performance of the system in accordance with the present invention is in any case close to the limit of the system.

The distributed IN coprocessor watermarks approach of the present invention proved effective in helping the system to overcome periods in which many calls were dropped. Fine tuning of the high and low watermarks was used to "smoothen" the behavior of the system in the case of jittery performance during overloads.

Node Crashes

The performance of the IN coprocessor in the case of a node failure was tested in two situations when one of the QEs was killed after 500,000 calls (out of the 1,000,000 for which measurements were taken) and when one of the EAs was killed after 500,000 calls. In both, the killed process did not "announce" its failure to any other process, simulating a real crash in the system. In this case, there are roughly 6 seconds until Horus detects this failure. In these 6 seconds, the primary-backup mechanism makes sure that no calls will be dropped. Also, at the end of these 6 seconds, a view change must take place, which is a more expensive operation to do than a regular receipt of a message. Thus, potentially, a view change may also cause a few calls to miss their deadlines.

In the distributed IN coprocessor system according to the present invention no significant number of calls was dropped during these 6 seconds. Thus, the system was able to successfully mask the injected failures, due to the fact that half the deadline, i.e., 50 microseconds, is much longer than the communication time and the compute time for each request.

Node Recovery

Similarly, the process of recovering a node after a crash has been tested in the present IN coprocessor. In the first case, one QE was added to the coprocessor roughly after half the measurements time. In the second case, the system started to operate with only one EA, and then one more EA was added to the system roughly after half the time.

The system was successfully capable of adding an EA without any noticeable effects on its ability to meet deadlines. The results summarized in FIGS. 4(a) and 4(b) hold for this case as well. FIG. 4(c) summarizes the effect of adding a QE to the system. In particular, FIG. 4(c) illustrates behavior of the system with 10 QEs during runs in which a QE is added in the middle, i.e. roughly after 500,000 calls. The graph presents the percentage of calls that made their deadline when the load was 20,000 calls per second, 22,000 calls per second, and 23,000 calls per second.

It is therefore apparent that the present invention accomplishes its intended objects. The present invention implements group communication technology in a telecommunication network to simplify the task of developing distributed applications, detect failures of the structural elements, and to provide for automatic network reconfiguration while maintaining the fault-tolerance requirements of the SS7 protocol specifications. Clusters of computers as an IN coprocessor are used to communicate with a single switch in a hierarchial switching node. A method is provided for implementing a hierarchical switching node that continually sustains a large number of requests per minute. A high throughput hierarchical switching node is provided by buffering incoming requests, corresponding to several calls, for a short period of time and then serving the buffered requests all together, keeping the requests in a cyclic set of queues, and using the water marks approach to overcome overloads in the network.

While an embodiment of the present invention has been described in detail, that is done for purposes of illustration, not limitation.

What is claimed is:

1. A method for delivering telecommunication services, comprising the steps of:
   a) providing a telecommunication switching system, a pair of external adaptors, a plurality of database systems and an update interface operatively associated with a group communication system for services including communication and failure detection;
   b) sending a query from the telecommunication switching system to one of the external adaptors via a communication link;
   c) aggregating and keeping in a cyclic set of queries the queries to be serviced and wherein the cyclic set of queries has a last queue;
   d) propagating the query from said one of the external adaptors to one of the plurality of database systems;
   e) determining in said one database system a response to the query;
   f) establishing a time for the response to be reported by said one database system, and periodically scanning the last queue by a sweeper to reissue the queries that have not been replied to by a database system;
   g) if timely, reporting the response from said one database system to at least one of the external adaptors;
   h) sending the response from the external adaptors to the telecommunication switching system; and
   i) updating the contents of the plurality of database systems by means of the update interface.

2. The method of claim 1, wherein the telecommunication switching system sends a query to said pair of external adaptors and the external adaptors determine a primary from the pair of external adaptors depending on the parity of the query.

3. The method of claim 2, wherein said one of the plurality of database systems servicing the query relays the reply to both of the pair of external adaptors.

4. The method of claim 3, wherein the second of the pair of external adaptors reissues the query to a second of the plurality of database systems that has not serviced the query before if the one of the pair of external adaptors has not received a reply from said one database system after half an expected deadline.

5. The method of claim 1, further comprising employing a watermark approach in servicing incoming queries.

6. The method of claim 1, wherein an application level is provided in addition to the group communication system and wherein queries at the one of the external adaptors and responses from the one of the plurality of database systems are buffered at the application level and a message is allocated in the group communication system only when buffered data needs to be sent.

7. The method of claim 1, wherein updating is performed according to first-in-first-out ordering.

8. The method of claim 1, wherein the group communication system includes a failure detector and wherein when failure of an external adaptor or a database system is detected the group communication system reconfigures itself to exclude the failed external adaptor or database system.

9. The method of claim 8, wherein when a recovered external adaptor or database system is added to the group communication system the recovered external adaptor or database system is updated to the current state of the other database systems.

10. The method of claim 1, wherein the group communication system is a Horus process group.

11. The method of claim 1, wherein the telecommunication switching system, the pair of external adaptors, the plurality of database systems and the update interface are provided as members of the same group communication system.

12. The method of claim 11, wherein the group communication system is a Horus process group.

13. A telecommunication system for delivering calling services, comprising:
   a) at least one telecommunication switching system;
   b) an intelligent network coprocessor comprising a pair of external adaptors, each of said external adaptors in communication with each other and with said switching system;
   c) a plurality of database systems interconnected between each other and connected to said pair of external adaptors by a communication link, and means connected to the plurality of database systems for updating the contents of one or more database systems;
   d) means for sending a query to one of said pair of external adapters; wherein said one external adapter receiving the query sends the query to one of the database systems for servicing the query and then said one of the database systems replies to at least one of the external adaptors;
   e) means for reissuing the query to a database system that has not serviced the query before, if the reply from said one of the database systems was not received after a predetermined period of time; and
   f) wherein said pair of external adaptors, the plurality of database systems and the means for updating the contents of one or more database systems are operatively associated with a group communication system for services including communication and failure detection.

14. The telecommunication system of claim 13, wherein the group communication system is a Horus process group.

15. The telecommunication system of claim 13, wherein the pair of external adaptors, the plurality of database systems and the means for updating the contents of one or more database systems are the members of the same group communication system.

16. The telecommunication system of claim 15, wherein the group communication system is a Horus process group.

17. The telecommunication system of claim 13, wherein each of the pair of external adaptors is connected to the telecommunication switching system by a two-channel communication link.

18. A method for delivering telecommunication services, comprising the steps of:

a) providing a telecommunication switching system, a pair of external adaptors, a plurality, a plurality of database systems and an update interface operatively associated with a group communication system for services including communication and failure detection;

b) sending a query from the telecommunication switching system to one of the external adaptors wherein the step of sending the query from the telecommunication switching apparatus to the external adaptors depends upon the parity of the query;

c) propagating the query from the one of the external adaptors to a specific database system which replies to at least one of the external adaptors;

d) if the reply from the specific database system is not received within a predetermined period of time, reissuing the query from the other external adaptor to a database system that has not serviced the query before f) forwarding the received reply from the external adaptor to the telecommunication switching; and g) updating the contents of the database system by means of the update interface.

\* \* \* \* \*